June 6, 1967  C. T. N. JINASENA ET AL  3,323,381
BRAKE APPLYING MECHANISM
Filed Nov. 18, 1964  2 Sheets-Sheet 1
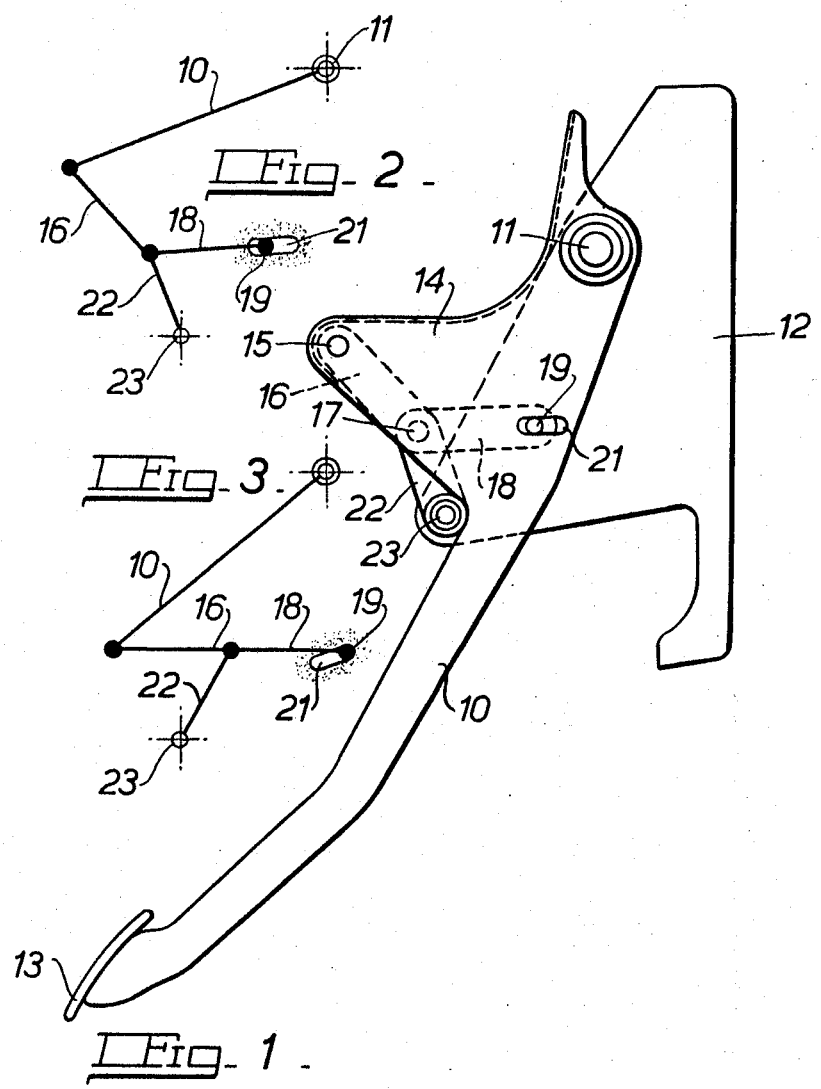
INVENTORS
GLYN PHILLIP REGINALD FARR
Colombapatabendige Tissaweera Nihal Jinasena
By Scrivener Parker Scrivener & Clarke

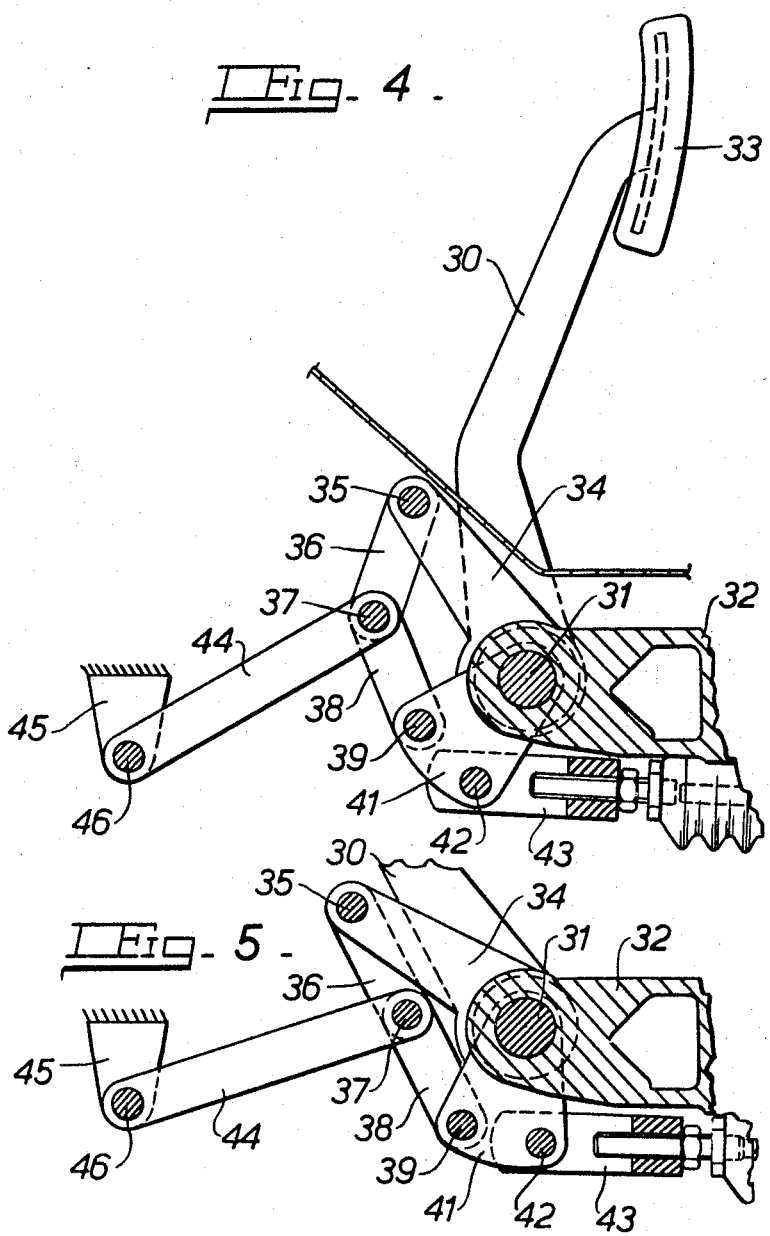

3,323,381
BRAKE APPLYING MECHANISM
Colombapatabendige Tissaweera Nihal Jinasena and Glyn Phillip Reginald Farr, County of Warwickshire, England, assignors to Girling Limited, Birmingham, England, a British company
Filed Nov. 18, 1964, Ser. No. 412,126
Claims priority, application Great Britain, Nov. 21, 1963, 45,962/63; June 9, 1964, 23,762/64
4 Claims. (Cl. 74—106)

This invention relates to improvements in mechanism for applying the brakes on a vehicle of the kind in which depression of a pedal actuates a transmission member which may be the piston of a master cylinder, a booster, or a part of a mechanical transmission.

In brake applying mechanism according to our invention a pedal actuates a transmission member through toggle linkage which provides initially a relatively rapid movement of the transmission member during the initial part of the pedal movement in order to take up clearances and bring the braking elements into engagement followed by a movement of the transmission member substantially directly proportional to the pedal movement.

The toggle linkage conveniently comprises a first toggle lever which is pivotally connected at one end to the brake pedal and at the other end to one end of a second toggle lever of which the other end is connected to or acts on a brake transmission member, and a link which is pivotally connected at one end to the junction of the toggle levers and at the other end is pivotally mounted on a stationary part.

The arrangement of the levers and the link is such that in the off position of the brake the toggle levers are inclined at an obtuse angle to each other and as the brake is applied the link causes the levers to move into alignment so that in the initial part of the pedal movement the transmission member is moved through a greater distance than it would be if it were coupled directly to the pedal. As the toggle levers come into alignment the movement of the brake transmission member corresponds substantially directly to that of the pedal.

Two forms of brake actuating mechanism in accordance with our invention are illustrated by way of example in the accompanying drawings in which:

FIGURE 1 is a side elevation of one form of brake actuating mechanism;

FIGURES 2 and 3 are line diagrams showing the mechanism in the "brake off" and in the "brake applied" position respectively;

FIGURE 4 is a side elevation of another form of mechanism shown in the "brake off" position; and FIGURE 5 is a side elevation showing the moving parts of the mechanism in the brake applied position.

In the mechanism illustrated in FIGURES 1 to 3 the brake pedal 10 is of the pendant type, the pedal being pivoted at its upper end on a pivot pin 11 in a stationary bracket 12 and having the foot pad 13 on its lower end. At a point spaced from the pivot the pedal has an extension 14 to which is pivoted by a pin 15 one end of a first toggle lever 16. The other end of this lever is pivotally connected by a pin 17 to one end of a second toggle lever 18 of which the other end carries a pin 19 working in a slot 21 in the pedal 10. The pin 19 is adapted to be connected to a brake transmission member (not shown) to be actuated.

The pivot pin 17 connecting the toggle levers is received in the free end of a link 22 of which the other end is pivotally mounted by means of a pin 23 on the bracket 12.

The two levers 16 and 18 form a toggle in which the relative angular disposition of the levers is controlled by the link 22 in accordance with the angular position of the pedal.

In the off position of the pedal as shown in FIGURE 1 and in FIGURE 2 the two toggle levers are at an obtuse angle to each other. A stop for the pedal is formed by the pivot pin 23 against which it is normally held by a return spring (not shown).

When the pedal is moved angularly in an anti-clockwise direction to apply the brake the first toggle lever 16 acting on the pin 17 connecting the levers and mounted in the free end of the link 22 rocks the link about its pivot 23 in a clockwise direction with the result that the two toggle levers are moved towards an "in-line" position and the pin 19 connected to the brake transmission member is moved through a greater distance than that through which it would be moved if it were directly mounted on the pedal.

Then as the two toggle levers become co-linear any further angular movement of the pedal moves the pin 19 through a distance corresponding substantially directly to the pedal movement.

In the mechanism shown in FIGURES 4 and 5 the pedal 30 is keyed at its lower end on a shaft 31 rotatably mounted in a stationary bracket 32, and the pedal carries a foot pad 33 at its upper end. An arm 34 disposed at an acute angle to the pedal is also keyed on the shaft 31 so that it moves angularly with the pedal.

The free end of the arm 34 is pivotally connected by a pin 35 to one end of a first toggle lever 36. The other end of this lever is pivotally connected by a pin 37 to one end of a second toggle lever 38 of which the other end is pivotally connected by a pin 39 to a quadrant 41 angularly movable about the shaft 31. A second pin 42 fixed in the quadrant pivotally connects to the quadrant a brake transmission member 43. The pin 37 which connects the toggle levers is mounted in the free end of a link 44 of which the other end is pivotally mounted on a fixed anchorage 45 by means of a pin 46.

In the off position of the mechanism shown in FIGURE 4 the toggle levers are at an obtuse angle to each other and are located in that position by the link 44. When the pedal is operated to apply the brake the lever 36 swings the link 44 about its pivot 46 in a clockwise direction which brings the toggle levers into line as shown in FIGURE 5 and in doing so causes the quadrant 41 to move through a greater angle than the pedal and to effect a correspondingly greater movement of the brake transmission member. On further angular movement of the pedal as the toggle levers come into alignment the quadrant moves through substantially the same angle as the pedal.

In both mechanisms the length of the link 22 or 44 will normally be such in relation to the disposition of the toggle levers that the levers do not move beyond the "in-line" or dead-centre position, but for some applications the levers may be arranged to move beyond that position to provide a further variation in the ratio of movement between the pedal and the brake transmission member.

An essential feature of the invention is that the movement of the pin connecting the toggle levers is positively controlled in such a manner that as the pedal is moved angularly the levers are brought from a position in which they are at an obtuse angle to each other into a position in which they are substantially in alignment. This result can be obtained by means other than a link pivoting about a fixed point. For example the pin connecting the toggle levers may be guided for movement in an arcuate slot in a fixed plate or other part and the pin may carry a roller working in the slot to reduce friction.

The brake transmission member may be the piston of an hydraulic master cylinder, a booster, or a part of a mechanical transmission.

We claim:
1. Brake applying mechanism comprising a pedal lever angularly movable about a stationary axis, a first toggle lever, a pivotal connection between one end of said first toggle lever and the pedal lever or a part moving angularly therewith, a second toggle lever, a pivotal connection between one end of said second toggle lever and a brake transmission member, a pivot pin pivotally connecting the other ends of said toggle levers, and a rigid control link pivotally connected at one end to said pivot pin and pivotally connected at its other end to a fixed point, said control link guiding said pivot pin in a path such that said first and second toggle levers are at an obtuse angle to each other in the off position of the pedal lever and are moved towards an aligned position on angular movement of the pedal lever in the brake-applying direction.

2. Brake applying mechanism as in claim 1 wherein said first toggle lever is pivotally connected to a point on the pedal lever spaced from the axis of the pedal lever and the second toggle lever is pivotally connected to a pin slidable in a slot in the pedal lever and adapted to actuate a brake transmission member.

3. Brake applying mechanism as in claim 1 wherein said first toggle lever is pivotally connected to the free end of an arm moving angularly with the pedal lever, said second toggle lever is pivotally connected to a quadrant which is angularly movable about the same axis as the pedal, and said quadrant is connected to a brake transmission member.

4. Brake applying mechanism comprising a pedal lever angularly movable about a stationary axis, a first toggle lever, a pivotal connection between one end of said first toggle lever and the pedal lever or a part moving angularly therewith, a second toggle lever, a pivotal connection between one end of said second toggle lever and a brake transmission member, a pivot pin pivotally connecting the other ends of said toggle levers, and guiding means for said pivot pin comprising a stationary plate and an arcuate slot in the plate in which said pivot pin is slidably engaged, said slot guiding said pivot pin in a path such that said first and second toggle links are at an obtuse angle to each other in the off position of the pedal lever and are moved towards an aligned position on angular movement of the pedal lever in the brake-applying direction.

References Cited
UNITED STATES PATENTS

| | | | |
|---|---|---|---|
| 1,563,035 | 11/1925 | Losee | 74—520 |
| 2,017,989 | 10/1935 | Pleasonton | 74—522 |
| 2,884,803 | 5/1959 | Willis | 74—106 |
| 2,910,147 | 10/1959 | Fishtahler et al. | 74—520 |

FRED C. MATTERN, JR., *Primary Examiner.*

F. E. BAKER, *Assistant Examiner.*